US012112764B2

(12) United States Patent
Ru et al.

(10) Patent No.: US 12,112,764 B2
(45) Date of Patent: Oct. 8, 2024

(54) DELAY ESTIMATION USING FREQUENCY SPECTRAL DESCRIPTORS

(71) Applicant: Nuvoton Technology Corporation, Hsinchu (TW)

(72) Inventors: Powen Ru, Gaithersburg, MD (US); Dung Nguyen, San Jose, CA (US); Andrew Zamansky, Santa Clara, CA (US)

(73) Assignee: Nuvoton Technology Corporation, Hsinchu (TW)

(*) Notice: Subject to any disclaimer, the term of this patent is extended or adjusted under 35 U.S.C. 154(b) by 184 days.

(21) Appl. No.: 17/823,521

(22) Filed: Aug. 31, 2022

(65) Prior Publication Data

US 2024/0071398 A1 Feb. 29, 2024

(51) Int. Cl.
*G10L 19/02* (2013.01)

(52) U.S. Cl.
CPC .................................... *G10L 19/02* (2013.01)

(58) Field of Classification Search
CPC ......... G01L 15/20; G01L 17/02; G01L 19/02; G01L 19/14; G01L 19/035; G01L 21/0216; G01L 21/0224; G01L 25/06; G01L 25/27; G01L 25/51; H04B 3/20; H04R 1/40; H04R 3/00; H04R 3/04; H04R 3/12; H04R 5/04
USPC .... 375/130, 219, 252, 295, 316; 381/56, 66, 381/92, 99, 158, 356, 359
See application file for complete search history.

(56) References Cited

U.S. PATENT DOCUMENTS

| | | | | |
|---|---|---|---|---|
| 9,916,840 | B1 * | 3/2018 | Do | H04M 9/082 |
| 10,602,270 | B1 * | 3/2020 | Sørensen | G10L 21/0208 |
| 11,012,800 | B2 * | 5/2021 | Tu | H04S 7/301 |

* cited by examiner

*Primary Examiner* — Shawkat M Ali
(74) *Attorney, Agent, or Firm* — Kilpatrick Townsend & Stockton LLP

(57) ABSTRACT

A method is disclosed to estimate the delay between an original signal and the corresponding captured signal. The signals are transformed and buffered to two sets of spectral descriptors for a similarity measure. The method advantageously offers robust delay estimation for inconsistent delays and adverse spectral distortions.

20 Claims, 13 Drawing Sheets

DELAY ESTIMATION USING FREQUENCY SPECTRAL DESCRIPTORS

BACKGROUND OF THE INVENTION

This invention relates to an audio system. Some embodiments relate to a system and method for signal delay estimation, more specifically a delay estimation method using spectral descriptors for a system with inconsistent delay and adverse distortions.

An audio system may experience inconsistent delays (fixed or drifting). The delay may be longer than what most adaptive filters can handle. For example, a typical acoustic echo cancellation (AEC) method employs a 16-block adaptive filter, where each block is 8-msec in length and limits the nominal delay between the audio content and the signal captured via a microphone within 14 of the blocks to be effective, i.e., less than 4 blocks, 32-msec. Moreover, a known delay can also assist the buffer control to save the zero-response delay taps for longer echo tails.

A conventional method to estimate the delay is simply locating a candidate delay with maximum cross-correlation or minimum distance between the audio content and the captured signal. Another more advanced way is to use the generalized cross-correlation (GCC) of the spectrograms to determine the delay. However, the spectrogram of the captured signal may adversely include the information affected by many uncertainties as the user may change loudspeakers or listening environments. For example, some of the uncertainties include:

1) different loudspeaker equalizer (EQ) settings;
2) different loudspeaker frequency responses;
3) different room responses;
4) near-end voice; and
5) background noise.

The latter two are additive and a user would reasonably turn the volume up enough to overcome background noise thus the audio signal captured by a microphone should be dominated by the intended audio content. However, the first three yields convoluted response that are hard to separate from the spectrogram of the captured signal.

Therefore, there is a need for improved system and method that can determine reliable delays.

BRIEF SUMMARY OF THE INVENTION

In some embodiments, a method is disclosed to estimate the delay between an original signal and the corresponding captured signal. The signals are transformed and buffered to two sets of spectral descriptors for a similarity measure. The method advantageously offers robust delay estimation for inconsistent delays and adverse spectral distortions.

According to some embodiments, a system includes a host device to provide a known waveform, a signal transmitter to receive the known waveform from the host device via a channel and to emit a signal corresponding to the known waveform, and a signal receiver to convert the signal to a received waveform and send the received waveform to the host device.

The host device comprises a processor being configured to:

transform the known waveform to a reference spectral descriptor matrix and a reference magnitude representation matrix;

transform the received waveform via the signal receiver to a received spectral descriptor matrix;

obtain a similarity measure between the reference spectral descriptor matrix buffer and the received spectral descriptor matrix;

accumulate the similarity measure based on at least one statistic of the reference magnitude representation matrix to obtain a cumulative similarity measure;

determine a delay based on the cumulated similarity measure; and output information characterizing the determined delay.

In some embodiments of the above system, the known waveform is an audio content, the signal transmitter is a loudspeaker, the signal is an acoustic signal, and the signal receiver is a microphone.

In some embodiments, the channel is a wired channel including one of High-Definition Multimedia Interface (HDMI) and Universal Serial Bus (USB).

In some embodiments, the channel is a wireless channel including one of Bluetooth and WiFi.

In some embodiments, the processor is configured to convert the waveform to a spectrum, add a floor to the spectrum, convert the floor-added spectrum to a logarithmic spectrum, convert the logarithmic spectrum to a series of coefficients via a transformation method, wherein less than 30% of the coefficients are used as the spectral descriptors to represent the waveform.

In some embodiments, the transforming is discrete cosine transform (DCT).

In some embodiments, the transformation method is one of discrete sine transform (DST), cepstrum, principal component analysis (PCA), and wavelet transform (WT).

In some embodiments, the magnitude representation is a root-mean-square (RMS) of the waveform.

In some embodiments, the magnitude representation is a maximum magnitude, an average magnitude, a power, or a sound pressure level (SPL) of the waveform.

In some embodiments, the similarity measure is cross-correlation.

In some embodiments, the similarity measure is distance.

In some embodiments, the statistic is minimum, average, or sum.

In some embodiments, the delay with maximum cumulated cross-correlation is determined as the estimated delay.

In some embodiments, the delay with minimum cumulated distance is determined as the estimated delay.

According to some embodiments, a computer-implemented method includes transforming a known waveform to a reference spectral descriptor matrix and storing it in a first buffer, transforming the received waveform to a received spectral descriptor matrix buffer and storing it in a second buffer, and transforming the known waveform to a reference magnitude representation matrix and storing it in a third buffer. The method also includes obtaining a similarity measure between reference spectral descriptor matrix buffer and the received spectral descriptor matrix, accumulating the similarity measure based on at least one statistic of the reference magnitude representation matrix to obtain a cumulative similarity measure, and determining a delay based on the cumulated similarity measure. The method further includes and outputting information characterizing the determined delay.

In some embodiments, the processor is configured to convert the waveform to a spectrum, add a floor to the spectrum, convert the floor-added spectrum to a logarithmic spectrum, convert the logarithmic spectrum to a series of coefficients via a transformation method, wherein less than 30% of the coefficients are used as the spectral descriptors to represent the waveform.

In some embodiments, the transforming is discrete cosine transform (DCT).

In some embodiments, the magnitude representation is a root-mean-square (RMS) of the waveform.

In some embodiments, the similarity measure is cross-correlation, and a delay with maximum cumulated cross-correlation is determined as the estimated delay.

In some embodiments, the similarity measure is distance, and a delay with minimum distance is determined as the estimated delay.

BRIEF DESCRIPTION OF THE DRAWINGS

For a more complete understanding of the disclosure, reference should be made to the following detailed description and accompanying drawings wherein.

DETAILED DESCRIPTION OF THE INVENTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein. Among other things, the features of the disclosure can be facilitated by methods, devices, and/or embodied in articles of commerce. The following detailed description is, therefore, not to be taken in a limiting sense.

Figure 1:
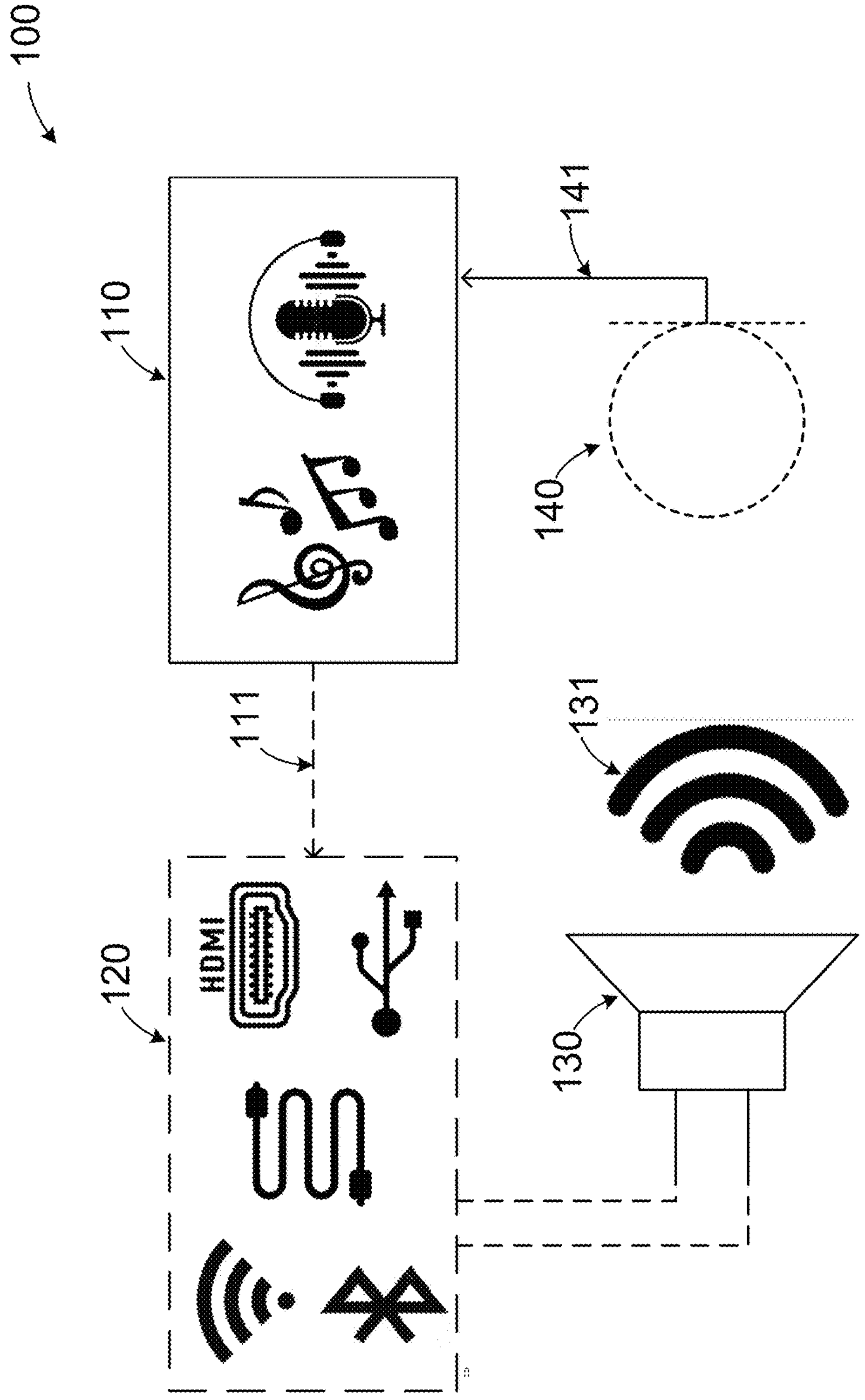
FIG. 1 depicts a system to playback signal content via an external emitter and capture the emitted signal via a built-in receiver.

FIG. 1 shows a simplified exemplar audio system to playback an audio content via an external loudspeaker (wired, e.g., HDMI, USB; or wireless, e.g., Bluetooth, WiFi) according to some embodiments of the present invention. As shown in FIG. 1, audio system 100 represents a system for determining a delay between an original audio signal and a corresponding captured signal. In the example of FIG. 1, audio system 100 includes a host device 110 to provide a known waveform 111 that represents an audio content. The audio content can be speech or music, or other audio signals. Audio system 100 also includes a signal transmitter 130, which, in this example, is a loudspeaker, to receive the known waveform 111 from the host device 110 via a channel 120 and to emit a signal 131, which is an acoustic signal corresponding to the known waveform 111. In FIG. 1, channel 120 can be a wired channel, such as HDMI, USB, coaxial cable, etc. Alternatively, channel 120 can also be wireless, such as Bluetooth, WiFi, etc. Audio system 100 also includes a signal receiver 140 to convert the signal 131 to a received waveform 141 and send the received waveform 141 to the host device 110. In some embodiments, the host device 110 includes a processor configured to determine a delay between the received waveform 141 and the known waveform 111. An example of the host system 110 is described below with reference to FIG. 13.

Figures 2A, 2B, 2C:
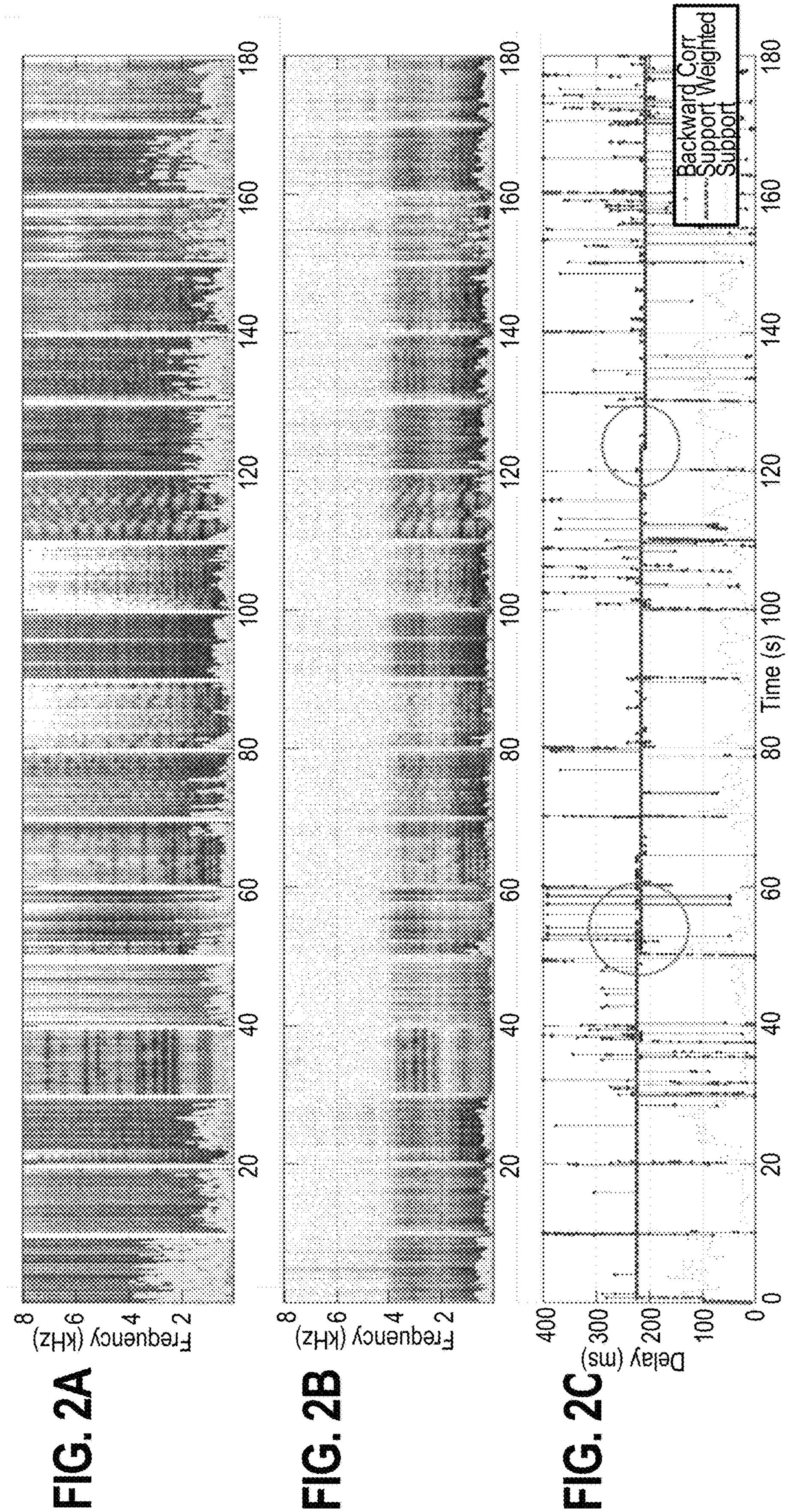
FIG. 2A, FIG. 2B, and FIG. 2C depict the spectrograms of emitted/received signals and delay estimation/decision according to various embodiments of the present invention.

FIGS. 2A-2C depict the spectrograms of emitted/received signals and delay estimation/decision according to various embodiments of the present invention. FIG. 2A and FIG. 2B depict the spectrograms of emitted/received music signals, respectively, for a music example played back by a Bluetooth loudspeaker, but with narrow bandwidth. FIG. 2A shows the spectrogram of the emitted signal. FIG. 2B shows the spectrogram of the received signal, which has no high frequency components due to the limited bandwidth of the loudspeaker. FIG. 2C depicts the delay estimation/decision for the music example as determined by the delay estimation system and method according to some embodiments described below. The drifting delay can be seen to be one frame (128 samples) every minute (circled in the plot), equivalent to two samples per second, e.g., the difference between sample rates 15999 and 16001 Hz.

Figures 3A, 3B, 3C, 3D:
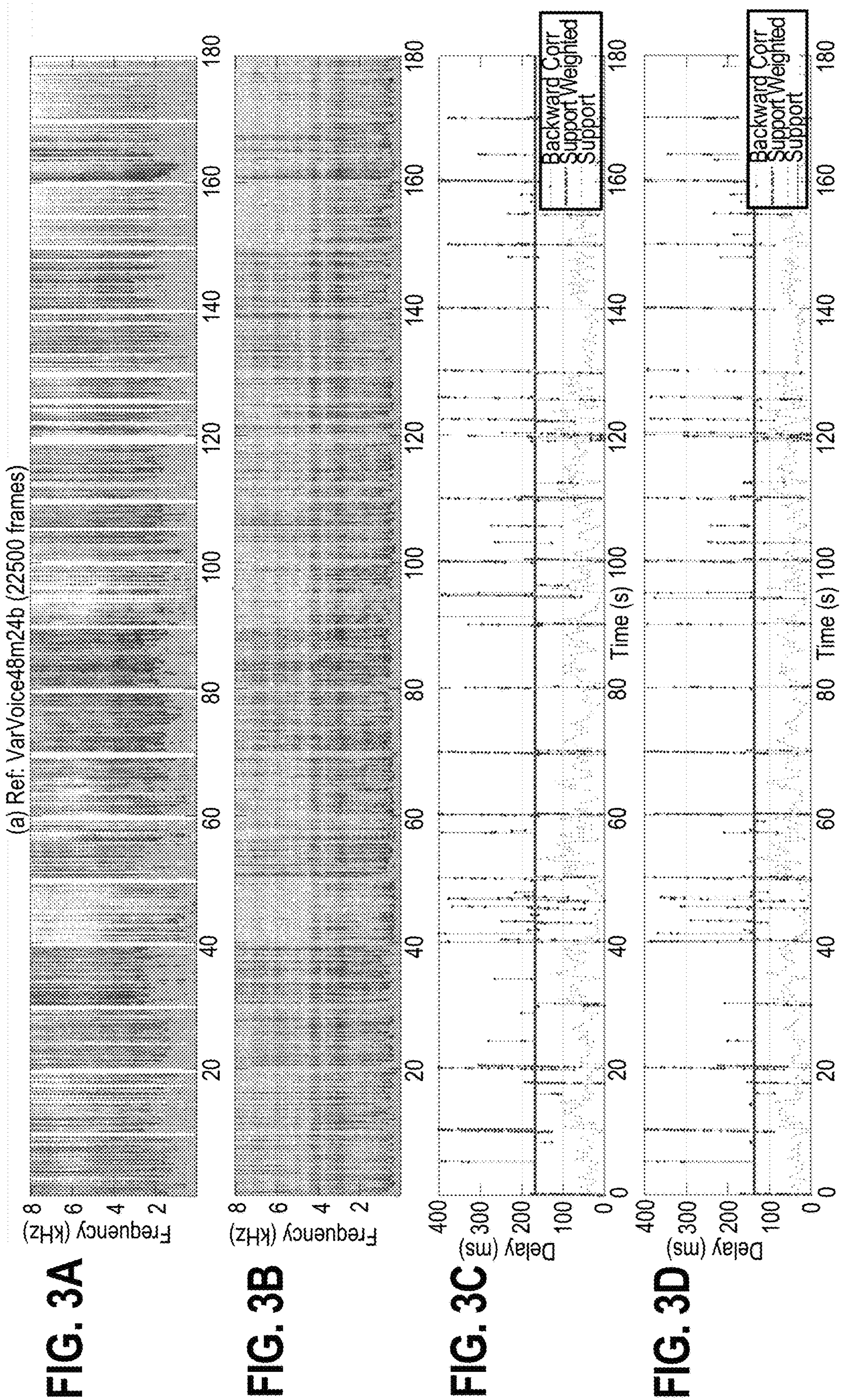
FIG. 3A, FIG. 3B, FIG. 3C, FIG. 3D depict the spectrograms of another set of emitted/received signals and delay estimation/decision according to various embodiments of the present invention.

FIGS. 3A-3D depict the spectrograms of another set of emitted/received signals and delay estimation/decision according to various embodiments of the present invention. FIGS. 3A and 3B depict the spectrograms of emitted/received voice signals, respectively. FIG. 3A shows the spectrogram of the emitted signal. FIG. 3B shows the spectrogram of the received voice example played back by a HDMI/TV loudspeaker, which is distorted by the loudspeakers frequency response and heavily affected by room response (e.g., horizontal white stripes in the plot). FIGS. 3C and 3D depict examples of delay estimation/decision for the music example during different sampling periods, as determined by the delay estimation system and method described below according to some embodiments. As can be seen in FIGS. 3C and 3D, separately, the delay is fixed throughout the recording, but inconsistent across different recording periods. For example, the delay is estimated to be about 168 msec for the sampling period in FIG. 3C and about 136 msec for the sampling period in FIG. 3D about 136 msec.

Experimental results show that, overall, the delay estimation method described herein is applicable to various situations including, but not limited, different spectral distortions, different contents, inconsistent delays, or drifting delays.

Figure 4:
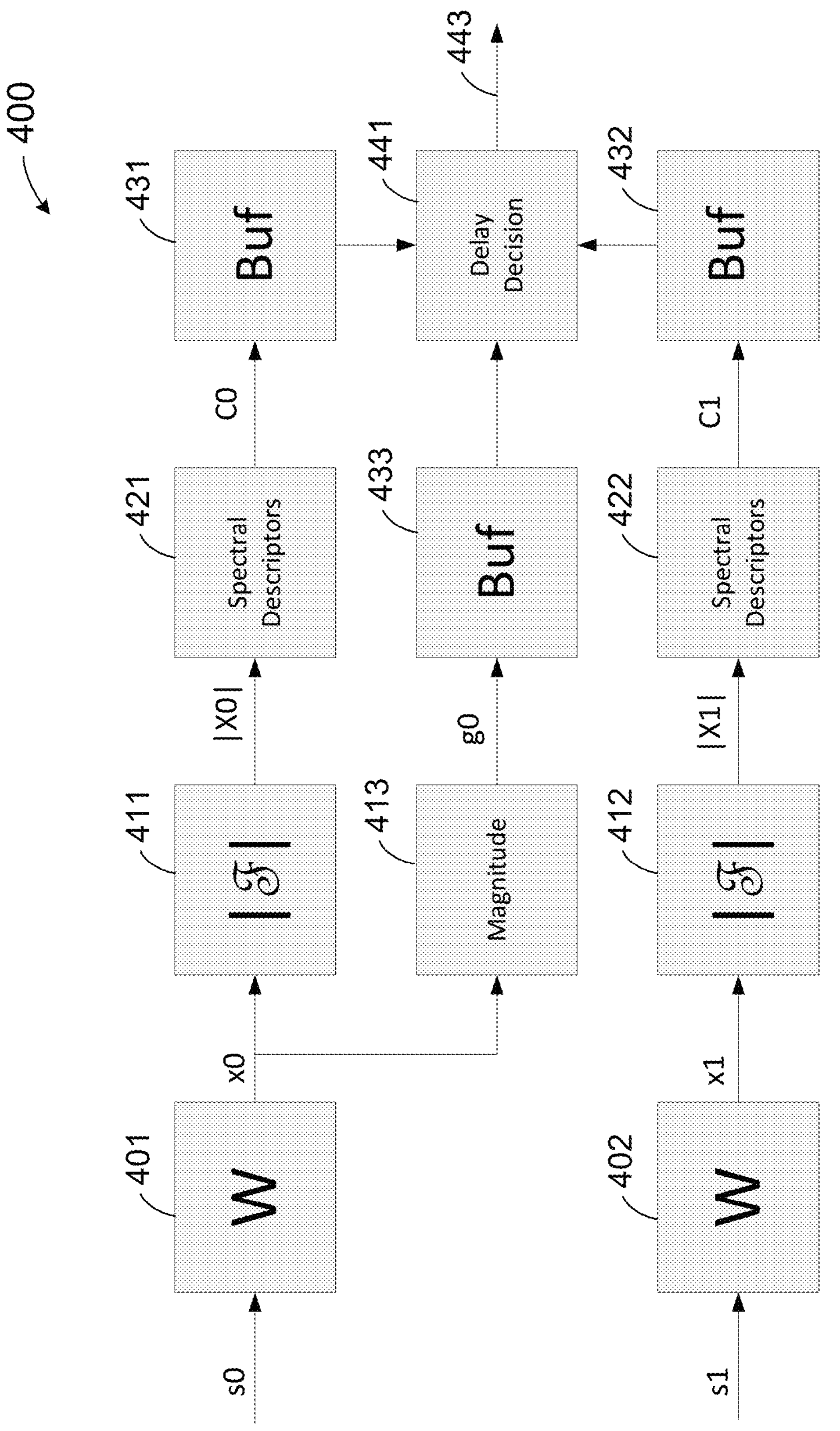
FIG. 4 depicts the block diagram of a delay estimation method according to various embodiments of the present invention.

FIG. 4 depicts a method for determining a delay of the system 100 of FIG. 1 according to some embodiments of the present invention. FIG. 4 illustrates method 400 employed by host system 110 of FIG. 1 for determining the delay. The method 400 receives digitally sampled signals (e.g., 16 kHz audio signal) represented by a known waveform (e.g., audio content) $s_0[n; m]$ to be emitted via a signal transmitter (e.g., loudspeaker) and a received waveform $s_1[n; m]$ captured via a signal receiver (e.g., microphone), on frame-basis (e.g., 128 samples, i.e., 8 msec), where integer m is the index of a frame and integer n is the index of the digital data. A first windowing module 401 and a second windowing module 402 apply a windowing function w[n] (e.g., Hanning window, 256 points) to modulate the framed signal and its memory (e.g., the previous frame) to generate windowed reference signals $x_0[n; m]$ and windowed received signal $x_1[n; m]$, as follows.

$$x_0[n;m]=w[n]s_0[n;m]$$

$$x_1[n;m]=w[n]s_1[n;m]$$

In FIG. 4, the indices [n; m] of the signals are omitted to simplify the drawing.

The method 400 includes a magnitude module 413 to calculate a magnitude representation $g_0$ of the windowed reference signal ($x_0[n; m]$) and store it in a reference magnitude matrix, wherein the magnitude representation $g_0$ is the root-mean-square (RMS) of the windowed reference signal $x_0$. The magnitude representation may be or further include the maximum magnitude, the average magnitude, the power, or the sound pressure level (SPL) of the windowed reference, etc. The reference magnitude representation matrix comprises a plurality of frames of magnitude representation. The oldest frame of magnitude representation will be discarded before a new frame of magnitude representation is updated. The reference magnitude representation matrix is physically stored in a reference magnitude buffer 433.

The method 400 also includes first and second transformation modules 411 and 412 to transform the windowed signals $x_0[n; m]$ and $x_1[n; m]$ to their corresponding frequency representation $X_0[k; m]$ and $X_1[k; m]$ (k=1 . . . K, e.g., K=256 bins), respectively, via Fourier transform (FFT).

$$x_0[n;m]\xrightarrow{F}X_0[k;m]$$

$$x_1[n;m]\xrightarrow{F}X_1[k;m]$$

The frequency representation can be characterized by its first K/2 values (i.e., 128 bins). In some embodiments, the method 400 will only process the first K/2 values. The method 400 further includes first and second spectral descriptors module 421 and 422 to convert the magnitude of the spectra $X_0[k; m]$ and $X_1[k; m]$ to two sets of spectral descriptors C0 and C1, respectively, and store them in a reference spectral descriptor matrix and a received spectral descriptor matrix, respectively. Each matrix comprising a plurality of frames of spectral descriptors. The oldest frame of spectral descriptors will be discarded before a new frame of spectral descriptors are updated. The reference spectral descriptor matrix is physically stored in a reference spectral descriptor buffer 431 and the received spectral descriptor matrix is physically stored in a received spectral descriptor buffer 432. The method further includes a delay decision module 441 to make a delay decision 443 based on data in the reference spectral descriptor matrix, the received spectral descriptor matrix, and the reference magnitude matrix. Further details about the spectral descriptors are described below with reference to FIG. 5.

Figure 5:
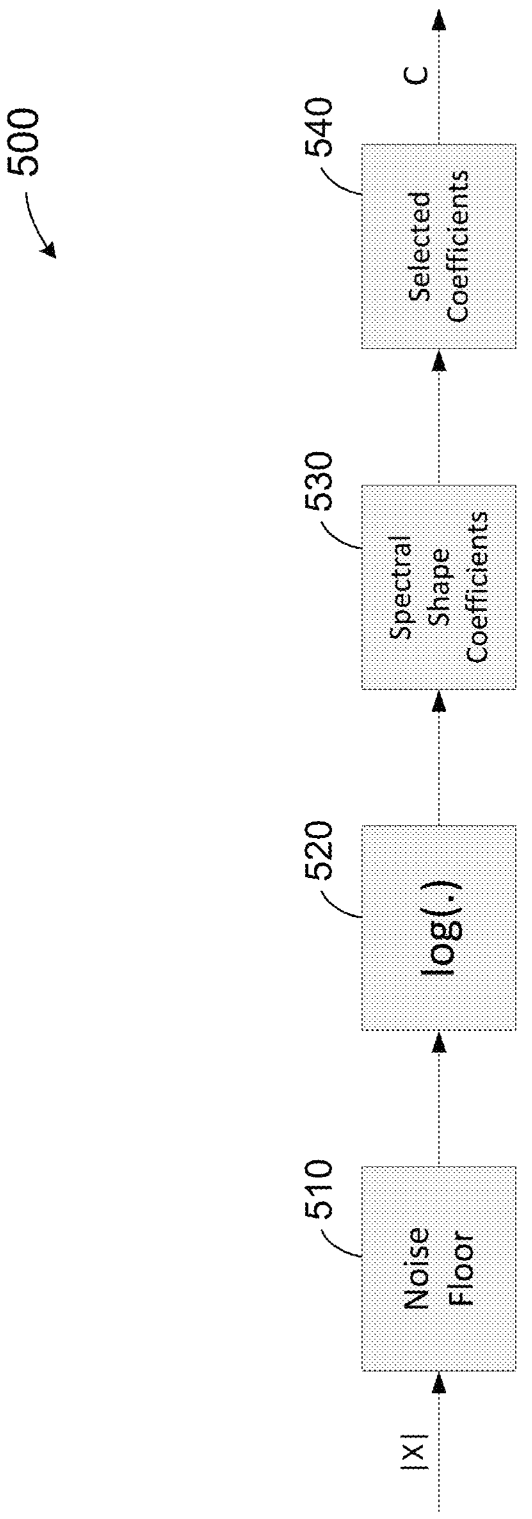
FIG. 5 depicts the block diagram of a method to generate spectral descriptors according to various embodiments of the present invention.

FIG. 5 is a simplified block diagram of a spectral descriptors module depicting a method for generating spectral descriptors. Spectral descriptors module 500 is an example of spectral descriptors module that can be used as spectral descriptors modules 421 and 422 in FIG. 4. As shown in FIG. 5, spectral descriptors module 500 is configured to perform the following processes.

At 510, add a noise floor 510 to avoid log(0);

At 520, convert the floor-added spectrum to a logarithmic spectrum for homomorphic processing;

At 530, convert the logarithmic spectrum to a series of coefficients via a transformation method a suitable spectral shape decomposition, e.g., discrete cosine transform (DCT), discrete sine transform (DST), cepstrum, principal component analysis (PCA), and wavelet transform (WT), etc.; and At 540, select a fraction of the spectral shape coefficients as a set of spectral descriptors, designated as C. Further details about the selected coefficient module 540 are described below with reference to FIG. 10.

Figure 6:
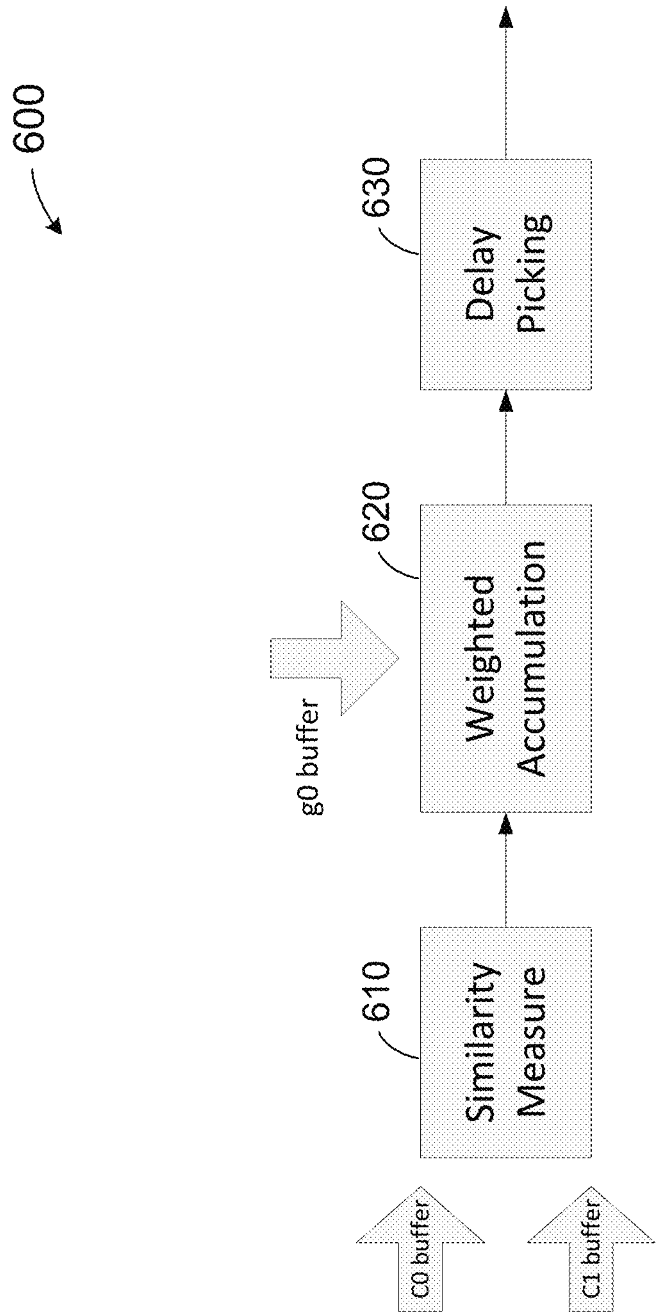
FIG. 6 depicts the block diagram of a method for generating a delay decision according to various embodiments of the present invention.

FIG. 6 depicts a simplified block diagram of a delay decision module illustrating a method for generating a delay decision according to some embodiments of the present invention. As shown in FIG. 6, delay decision module 600 is an example of delay decision module that can be used as delay decision module 441 in FIG. 4. In FIG. 6, delay decision module 600 includes a similarity measure module 610, a weighted accumulation module 620, and a delay picking module 630 configured to perform the following functions.

Module 610 is configured to obtain a similarity measure between data in the reference spectral descriptor matrix (C0 buffer 431 in FIG. 4) and the received spectral descriptor matrix (C1 buffer 432 in FIG. 4);

Module 620 is configured to accumulate the similarity measure based on at least one statistic of data in the reference magnitude representation matrix (g0 buffer 433 in FIG. 4) to obtain a cumulative similarity measure; and Module 630 is configured to determine a delay based on the cumulated similarity measure.

An estimated delay value is determined at a delay decision process according to a cumulated similarity measure based on the statistics of data in the reference magnitude matrix g0. In some embodiments, the similarity measure is either the cross-correlation or the distance between the data in two matrices given a candidate delay, and the statistics is at least one of the minimum, average, sum, and square sum. If the cross-correlation is chosen as the similarity measure, the delay with maximum cumulated cross-correlation is selected; if the distance is chosen as the similarity measure, the delay with minimum cumulated distance is selected. Further details about the delay decision module 600 are described below with reference to FIG. 11.

Figure 7:
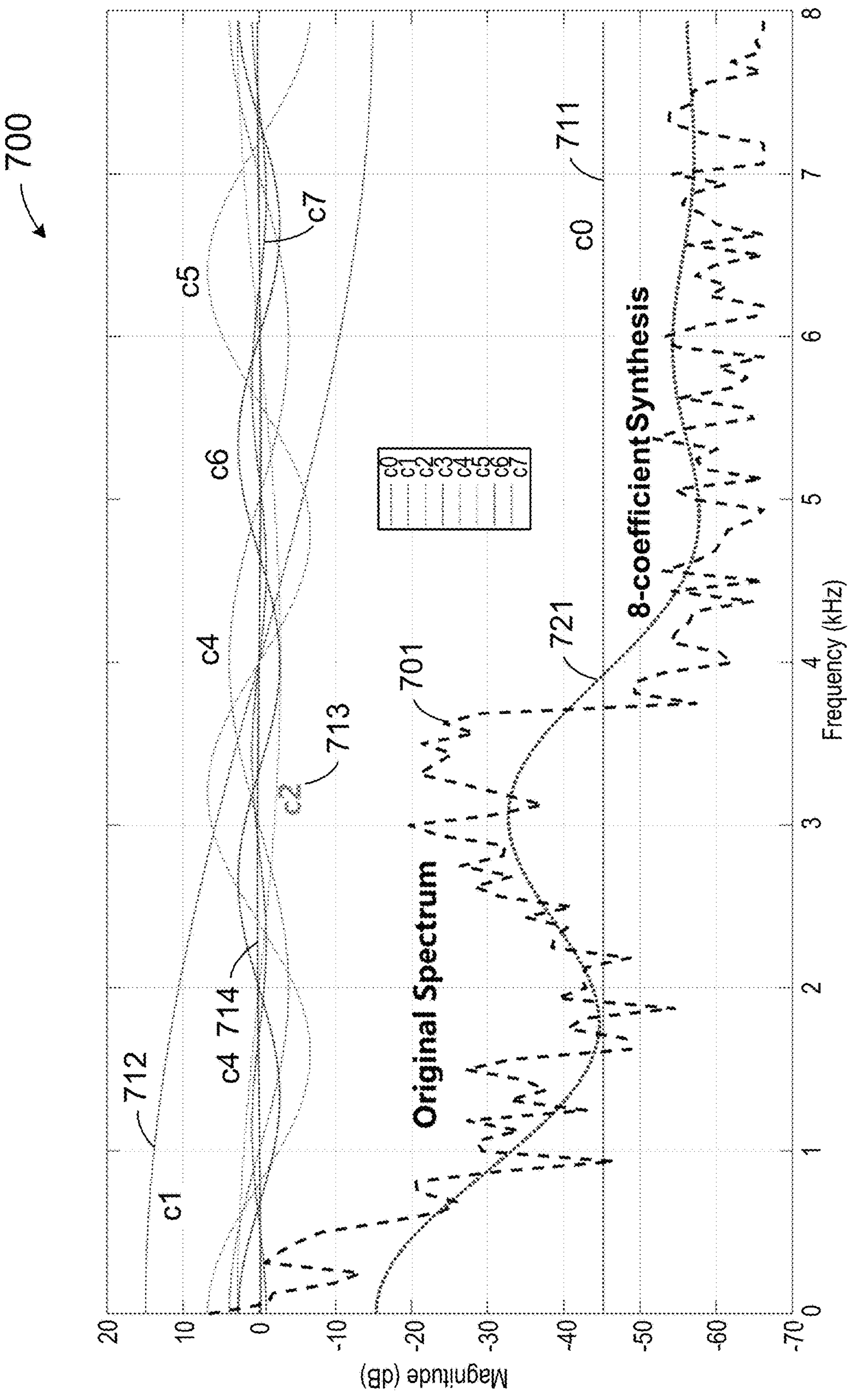
FIG. 7 depicts a limited set of spectral descriptors representing a signal according to some embodiments of the present invention.

FIG. 7 depicts an example of discrete cosine transformation (DCT) of a spectrum according to some embodiments of the present invention. A (DCT) expresses a finite sequence of data points in terms of a sum of cosine functions oscillating at different frequencies. For example, the coefficients for DCT can be expressed as follows.

$$c_j=\Sigma_{k=1}^{K/2}(X[k]\cos(2\pi j(k-1/2)/K)) \text{ for } j=0 \ldots K/2-1$$

In FIG. 7, curve 701 is the spectrum in a logarithmic scale of an audio signal. Also shown in FIG. 7 are the DCT coefficients c0~c7 in thin dot lines. The first coefficient 711 (c0) represents the average level of the spectrum. The second coefficient 711 (c1) represents the tilt or slope of the spectrum. The third coefficient 712 (c2) represents the compactness of the spectrum (e.g., centralized in the middle or diffused toward the edges). Higher coefficients c4-c7 provide further details of the spectrum. The dotted line 721 demonstrates a reconstructed spectrum based on limited set (i.e., the first eight) of DCT coefficients. Given such little information, the reconstructed spectrum represents a smoothed version of the original spectrum well. This example demonstrates that DCT is effective in the delay estimation method described herein.

Figure 8:
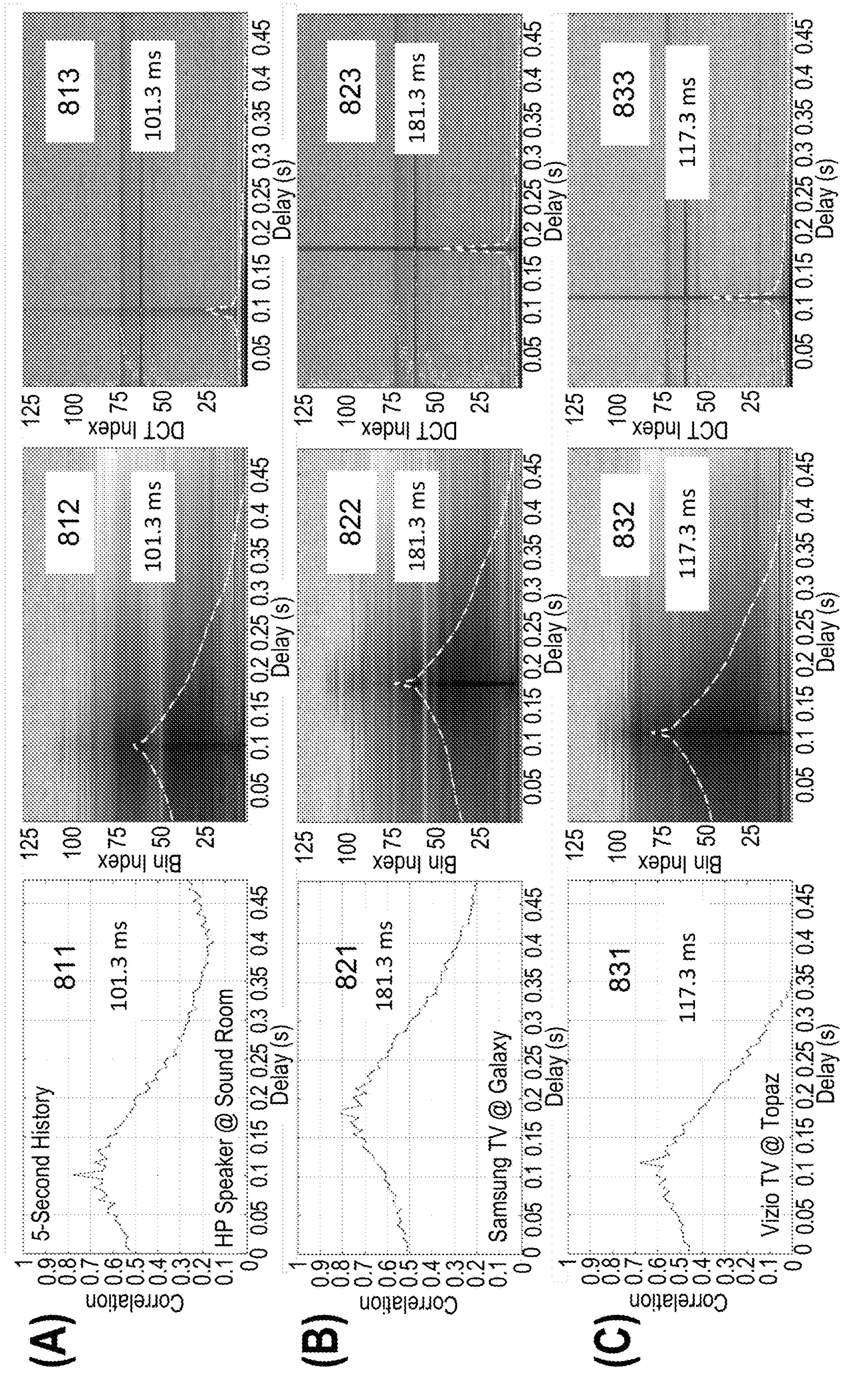
FIG. 8 depicts cross-correlations determined by different characteristics in long-term according to some embodiments of the present invention.

We have conducted studies to investigate how the spectral descriptors (e.g., DCT) are superior in representing its corresponding spectrum. FIG. 8 shows results for delay estimates using three different representations of the audio signal, RMS, FFT, and DCT. In FIG. 8, graphs 811, 812, and 813 show results of delay estimates for a first example (a) of audio signal based on RMS, FFT, and DCT, respectively, using 5 seconds of samples. In FIG. 8, graphs 821, 822, and 823 show results of delay estimates for a second example (b) of audio signal based on RMS, FFT, and DCT, respectively, using 5 seconds of samples. In FIG. 8, graphs 831, 832, and 833 show results of delay estimates for a third example (c) of audio signal based on RMS, FFT, and DCT, respectively, using 5 seconds of samples.

Based on the data in FIG. 8, we note that given long enough observation period (e.g., 5 seconds), all cross-correlations in FIG. 8 determined by different characteristics, namely RMS, FFT, and DCT, successfully indicates the delays for three different loudspeakers in three different rooms. For the first sample (A), all three methods determined an estimated delay of 101.3 msec. For the second sample (B), all three methods determined an estimated delay of 181.3 msec. For the third sample (C), all three methods determined an estimated delay of 117.3 msec. However, there are qualitative differences in the detailed results. The RMS results, 811, 821, and 831, the vertical axis shows the correlation based on RMS magnitude and the horizontal axis shows the delay, show a ragged correlation curve. The FFT results, 812, 822, and 832, in which the vertical axis shows the bin index based on FFT and the horizontal axis shows the delay, show a relatively smooth correlation curve. In contrast, the DCT results, 813, 823, and 833, in which the vertical axis shows the bin index based on DCT and the horizontal axis shows the delay, show sharp correlation curve that seems to be robust.

Figure 9:
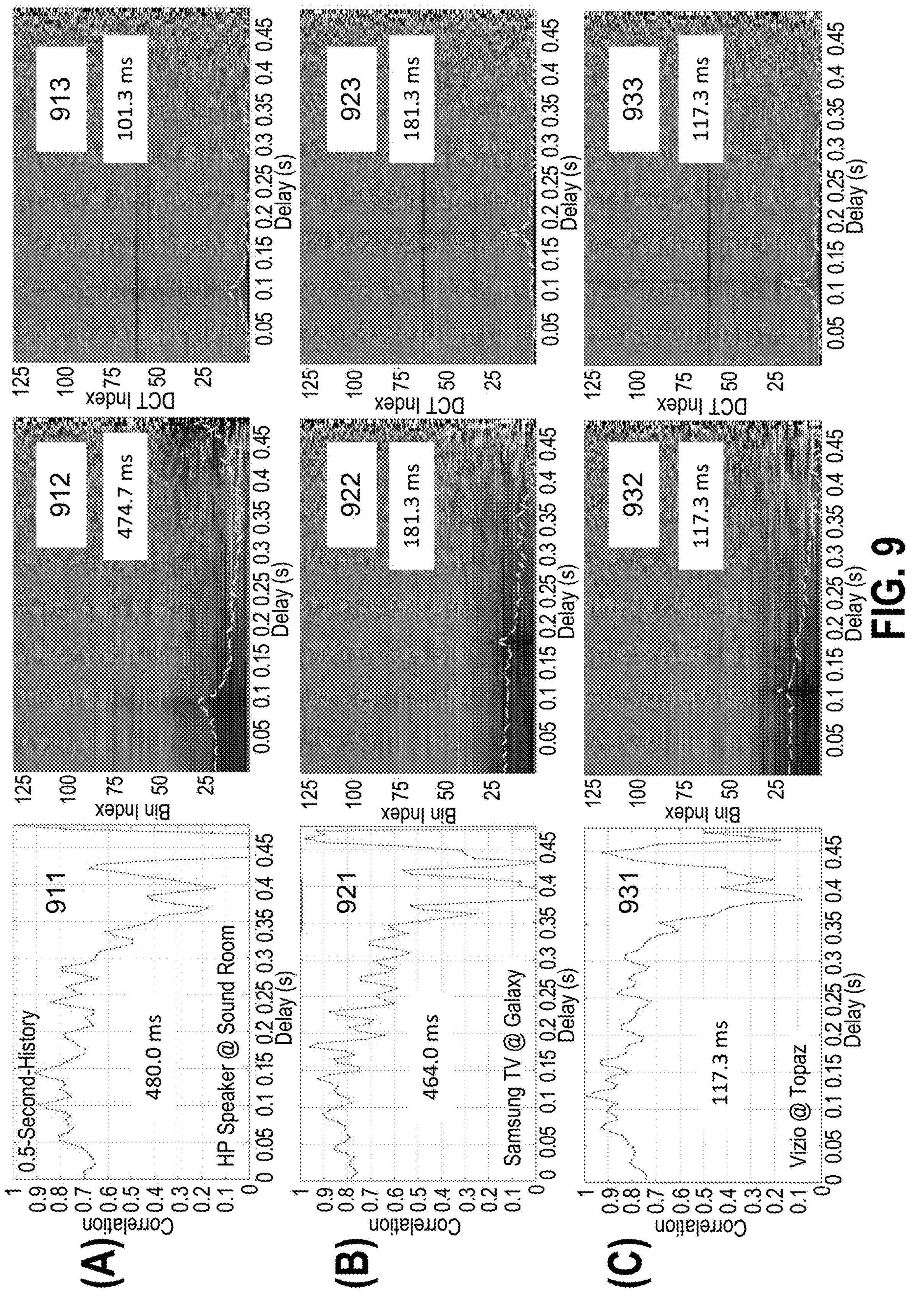
FIG. 9 depicts cross-correlations determined by different characteristics in short-term according to some embodiments of the present invention.

FIG. 9 shows results for delay estimates using three different representations of the audio signal, RMS, FFT, and DCT, similar to the graphs in FIG. 8, but using samples over a shorter period of sampling time according to some embodiments of the present invention. In FIG. 9, graphs 911, 912, and 913 show results of delay estimates for a first example (A) of audio signal based on RMS, FFT, and DCT, respectively, using 0.5 seconds of samples. In FIG. 9, graphs 921, 922, and 923 show results of delay estimates for a second example (B) of audio signal based on RMS, FFT, and DCT, respectively, using 0.5 seconds of samples. In FIG. 9, graphs 931, 932, and 933 show results of delay estimates for a third example (C) of audio signal based on RMS, FFT, and DCT, respectively, using 0.5 seconds of samples.

Based on the data in FIG. 9, we note that given a shorter observation period (e.g., 0.5 seconds versus 5 seconds), the RMS method fails to identify the accurate delay in two cases. The first sample (A) 911 provides an estimated delay of 480.0 msec, and the second sample (B) 921 provides an estimated delay of 464.0 msec. The RMS method only provides a correct estimated delay of 117.3 msec for the third sample (C). In comparison, the FFT method fails to indicate the accurate delay in one case, for the first sample (A) 912, which provides an erroneous estimated delay of 474.7 msec. In contrast, only the DCT method successfully determined corrected estimated delays for all three samples, as shown in graphs 913, 923, and 933.

Figure 10:
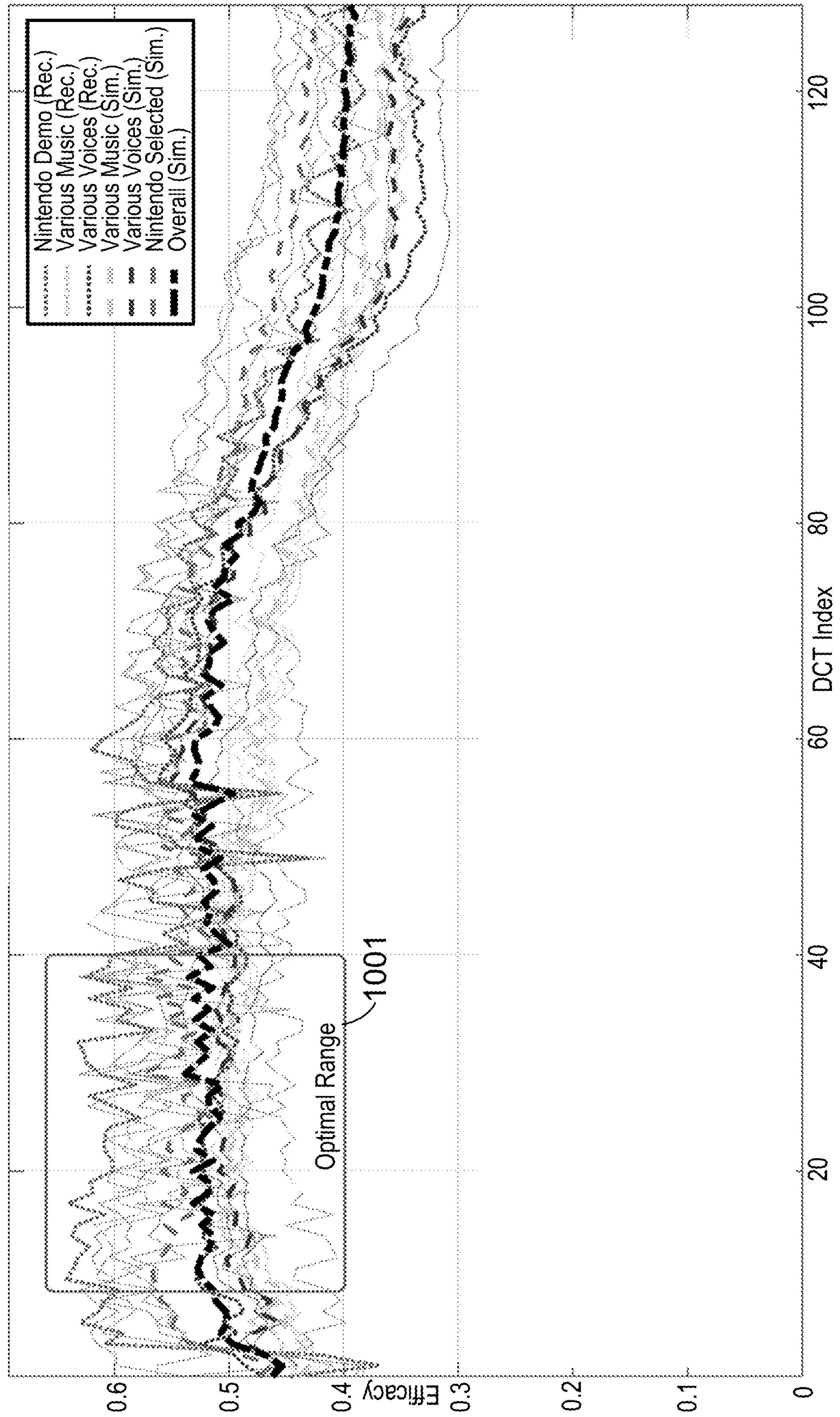
FIG. 10 depicts the delay decision efficacy of each spectral descriptor according to some embodiments of the present invention.

FIG. 10 depicts the delay decision efficacy of each DCT coefficient across different contents, different loudspeakers, or different rooms. Not all spectral descriptors have the same significance in the similarity measure. Take the DCT coefficients for example, the coefficients with lower indices may be affected by overall spectral distortion (e.g., EQs or loudspeaker frequency responses), while the coefficients with higher indices may be affected by sudden local spectral notches (e.g., room responses). We have conducted an investigation to determine the efficacy of each DCT index, also referred to as DCT coefficient, where the efficacy is defined by the sum of cross-correlation of 3-candidate-delay around the nominal delay derived by a long-term observation with human verification. In FIG. 10, the horizontal axis shows the DCT index, and the vertical axis shows the efficacy. Further, recorded and simulated results are shown for three different samples. The dotted lines show the recorded data, the dashed lines show the simulated data, the thick dashed line shows the overall data. It can be seen that the recordings and simulations show about the same results. Different content in the three samples show different efficacy but about the same trend. Further, of the 128 indices, indices number 8-39 show more correlation to delay estimate.

Higher efficacy means the DCT coefficient is more correlated to the delay. For these cases, of the 128 coefficients, one can select a fraction of them (e.g., 32 coefficients, from indices numbers 8-39) for delay estimation. Thus, 25% of the coefficients are used. In some embodiments, less than 30% of the coefficients are used. As an example, the rectangle 1001 in FIG. 10 marks the high efficacy DCT indices. Since the computation complexity of similarity measure (e.g., cross-correlation or distance) is proportional to the number of the selected spectral descriptors, it is advantageous to use fewer number of spectral descriptors to reduce the computation.

Therefore, in some embodiments, the system and method for determining the delay also includes selecting the high efficacy DCT indices for the similarity measure, as depicted in FIG. 5, at process 530 for spectral shape coefficients and, at process 540, for selected coefficients. Further, different similarity measures can be used, e.g., cross-correlation or distance, etc.

Figure 11:
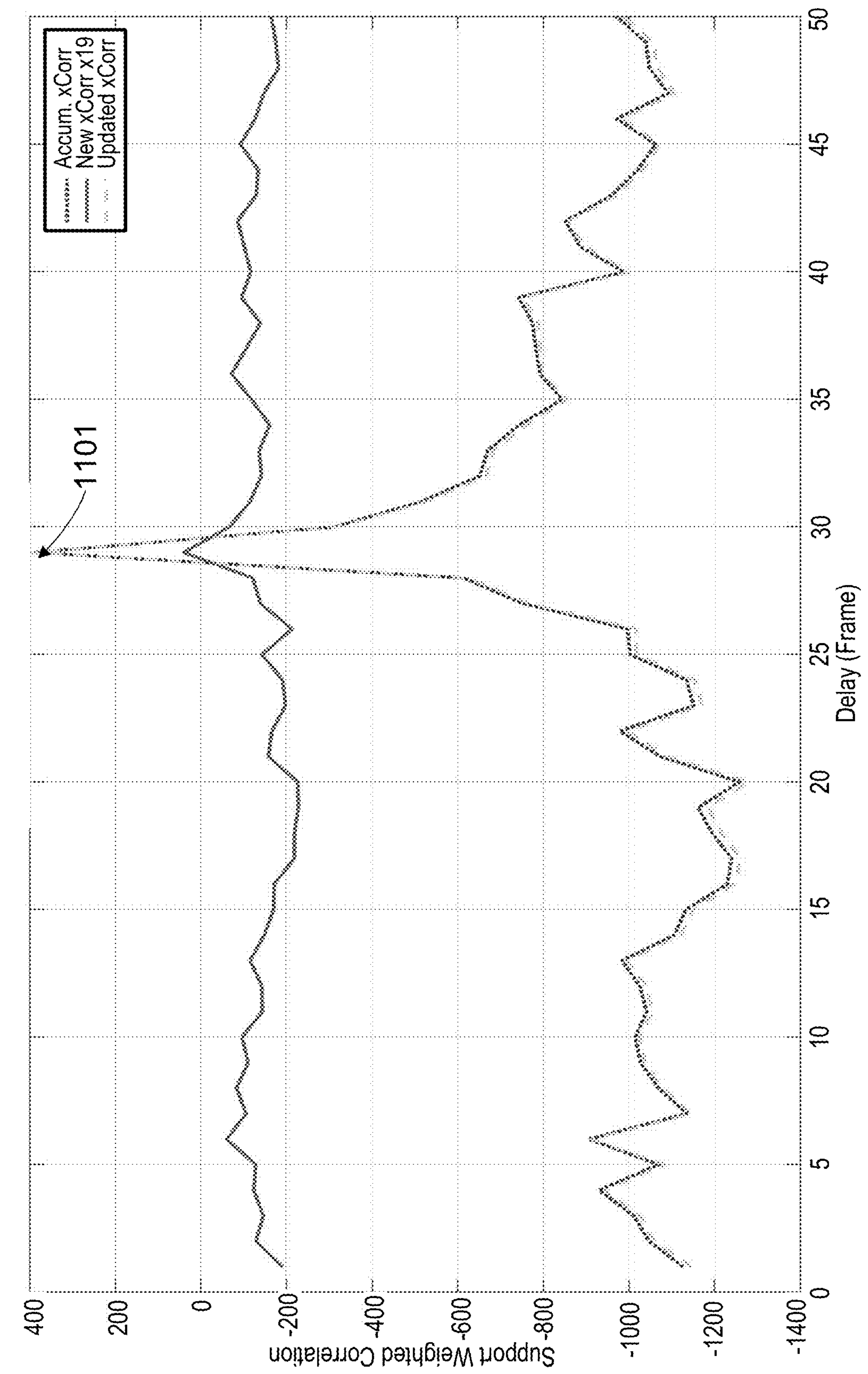
FIG. 11 depicts an example of delay decision based support weighted cumulated cross-correlation according to some embodiments of the present invention.

FIG. 11 depicts an example of delay decision based support weighted cumulated cross-correlation according to some embodiments of the present invention. In FIG. 11, the horizontal axis shows the delay in frames, and the vertical axis shows support weighted correlation. The dotted line shows accumulated cross-correlation, which is the current cross-correction. The solid line represents a new cross-correction, but magnified by 10 times for illustration purposes. In module 620 of FIG. 6, the weighted accumulation determines the updated cross-correction shown the dashed line, which is the current cross-correction plus the new cross-correction. In module 630 of FIG. 6, delay picking module, the peak point or maximum point, such as 1101 in FIG. 11, is determined to be the estimated delay.

Figure 12:
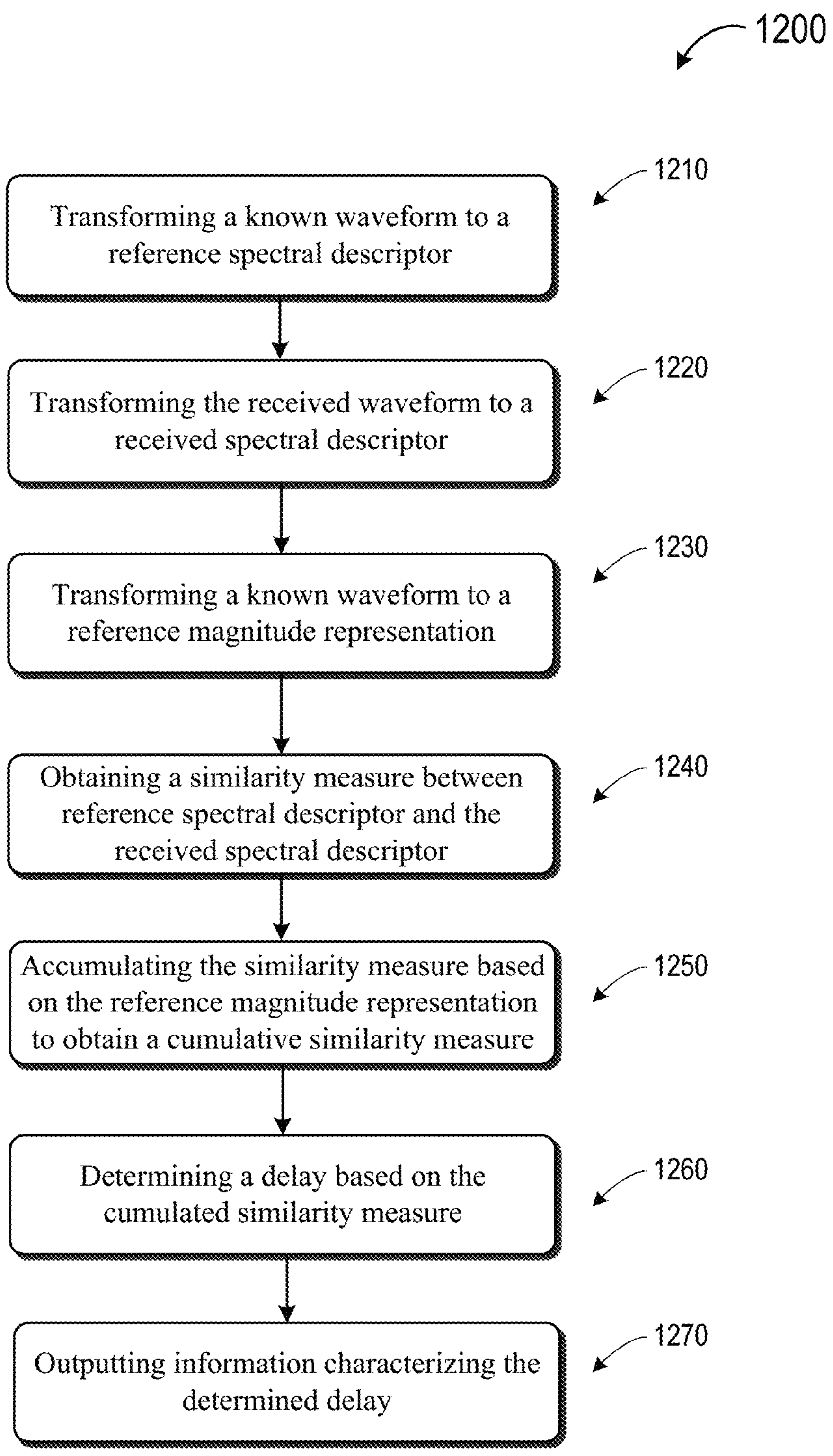
FIG. 12 is a simplified flow chart illustrating a method for determining a delay between two acoustic signals according to some embodiments of the present invention.

FIG. 12 is a simplified flow chart illustrating a method for determining a delay between two acoustic signals according to some embodiments of the present invention. As shown in FIG. 12, method 1200 includes the processes described below with reference to FIGS. 4-6.

At 1210, transforming a known waveform s0 to the reference spectral descriptor 421 and storing it in the reference spectral descriptor matrix (buffer 431);

At 1220, transforming the received waveform s1 to the received spectral descriptor 422 and storing it in the received spectral descriptor matrix (buffer 432);

At 1230, transforming the known waveform to the reference magnitude representation 413 and storing it in the reference magnitude representation matrix (buffer 433);

At 1240, obtaining a similarity measure between the data in reference spectral descriptor matrix and the received spectral descriptor matrix;

At 1250, accumulating the similarity measure 441 based on at least one statistic of the reference magnitude representation matrix (610 and 620) to obtain a cumulative similarity measure;

At 1260, determining a delay based on the cumulated similarity measure 630 (correlation maximum or distance minimum); and At 1270, outputting information characterizing the determined delay.

Figure 13:
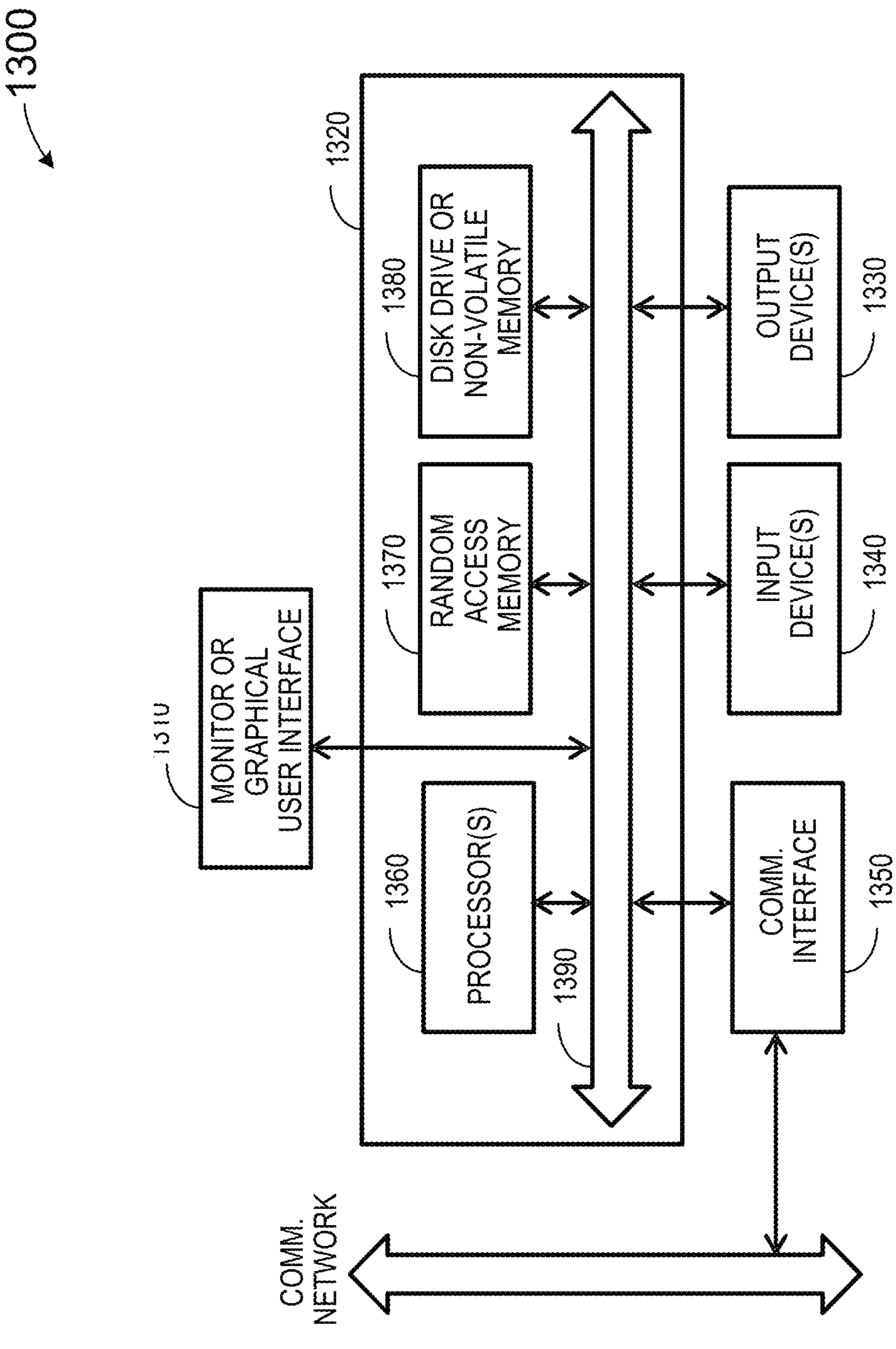
FIG. 13 is a simplified block diagram illustrating an apparatus that may be used to implement various embodiments according to the present invention.

FIG. 13 is a simplified block diagram illustrating an apparatus that may be used to implement various embodiments according to the present invention. FIG. 13 is merely illustrative of an embodiment incorporating the present disclosure and does not limit the scope of the disclosure as recited in the claims. One of ordinary skill in the art would recognize other variations, modifications, and alternatives. In one embodiment, computer system 1300 typically includes a monitor 1310, a computer 1320, user output devices 1330, user input devices 1340, communications interface 1350, and the like.

FIG. 13 is representative of a computer system capable of embodying the present disclosure. For example, host system 110 in FIG. 1 can be implemented using a system similar to system 1300 depicted in FIG. 13. The functions of methods 400, 500, and 600 depicted in FIGS. 4-6 can be carried out by one or more processors depicted in FIG. 13. For example, part of system 1300 can represent a digital signal processor that can be used to implement the modules and processors described above in connection with FIGS. 4-12. Alternatively, software codes executed in a general-purpose processor, such as described in system 1300, can be used to implement these modules. Further, the signal receiver 140 in system 100 of FIG. 1 can be implemented as peripheral devices in a system similar to system 1300. In addition, the transmission of the known waveform 111 in FIG. 1 can be implemented using output device(s) 1330.

As shown in FIG. 13, computer 1320 may include a processor(s) 1360 that communicates with a number of peripheral devices via a bus subsystem 1390. These peripheral devices may include user output devices 1330, user input devices 1340, communications interface 1350, and a storage subsystem, such as random access memory (RAM) 1370 and disk drive 1380.

User input devices 1340 can include all possible types of devices and mechanisms for inputting information to computer 1320. These may include a keyboard, a keypad, a touch screen incorporated into the display, audio input devices such as voice recognition systems, microphones, and other types of input devices. In various embodiments, user input devices 1340 are typically embodied as a computer mouse, a trackball, a track pad, a joystick, wireless remote, drawing tablet, voice command system, eye tracking system, and the like. User input devices 1340 typically allow a user to select objects, icons, text and the like that appear on the monitor 1310 via a command such as a click of a button or the like.

User output devices 1330 include all possible types of devices and mechanisms for outputting information from computer 1320. These may include a display (e.g., monitor 1310), non-visual displays such as audio output devices, etc.

Communications interface 1350 provides an interface to other communication networks and devices. Communications interface 1350 may serve as an interface for receiving data from and transmitting data to other systems. Embodiments of communications interface 1350 typically include an Ethernet card, a modem (telephone, satellite, cable, ISDN), (asynchronous) digital subscriber line (DSL) unit, FireWire interface, USB interface, and the like. For example, communications interface 1350 may be coupled to a computer network, to a FireWire bus, or the like. In other embodiments, communications interfaces 1350 may be physically integrated on the motherboard of computer 1320, and may be a software program, such as soft DSL, or the like.

In various embodiments, computer system 1300 may also include software that enables communications over a network such as the HTTP, TCP/IP, RTP/RTSP protocols, and the like. In alternative embodiments of the present disclosure, other communications software and transfer protocols may also be used, for example IPX, UDP or the like. In some embodiments, computer 1320 includes one or more Xeon microprocessors from Intel as processor(s) 1360. Further, in one embodiment, computer 1320 includes a UNIX-based operating system. Processor(s) 1360 can also include special-purpose processors such as a digital signal processor (DSP), a reduced instruction set computer (RISC), etc.

RAM 1370 and disk drive 1380 are examples of tangible storage media configured to store data such as embodiments of the present disclosure, including executable computer code, human readable code, or the like. Other types of tangible storage media include floppy disks, removable hard disks, optical storage media such as CD-ROMS, DVDs and bar codes, semiconductor memories such as flash memories, read-only memories (ROMS), battery-backed volatile memories, networked storage devices, and the like. RAM 1370 and disk drive 1380 may be configured to store the basic programming and data constructs that provide the functionality of the present disclosure.

Software code modules and instructions that provide the functionality of the present disclosure may be stored in RAM 1370 and disk drive 1380. These software modules may be executed by processor(s) 1360. RAM 1370 and disk drive 1380 may also provide a repository for storing data used in accordance with the present disclosure.

RAM 1370 and disk drive 1380 may include a number of memories including a main random access memory (RAM) for storage of instructions and data during program execution and a read-only memory (ROM) in which fixed non-transitory instructions are stored. RAM 1370 and disk drive 1380 may include a file storage subsystem providing persistent (non-volatile) storage for program and data files. RAM 1370 and disk drive 1380 may also include removable storage systems, such as removable flash memory.

Bus subsystem 1390 provides a mechanism for letting the various components and subsystems of computer 1320 communicate with each other as intended. Although bus subsystem 1390 is shown schematically as a single bus, alternative embodiments of the bus subsystem may utilize multiple busses.

FIG. 13 is representative of a computer system capable of embodying the present disclosure. It will be readily apparent to one of ordinary skill in the art that many other hardware and software configurations are suitable for use with the present disclosure. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc.; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present disclosure can be implemented in the form of logic in software or hardware or a combination of both. The logic may be stored in a computer-readable or machine-readable non-transitory storage medium as a set of instructions adapted to direct a processor of a computer system to perform a set of steps disclosed in embodiments of the present disclosure. The logic may form part of a computer program product adapted to direct an information-processing device to perform a set of steps disclosed in embodiments of the present disclosure. Based on the disclosure and teachings provided herein, a person of ordinary skill in the art will appreciate other ways and/or methods to implement the present disclosure.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that, when the hardware modules or apparatuses are activated, they perform the associated methods and processes. The methods and processes disclosed herein may be embodied using a combination of code, data, and hardware modules or apparatuses.

Certain embodiments have been described. However, various modifications to these embodiments are possible, and the principles presented herein may be applied to other embodiments as well. In addition, the various components and/or method steps/blocks may be implemented in arrangements other than those specifically disclosed without departing from the scope of the claims. Other embodiments and modifications will occur readily to those of ordinary skill in the art in view of these teachings. Therefore, the following claims are intended to cover all such embodiments and modifications when viewed in conjunction with the above specification and accompanying drawings.

What is claimed is:

1. A system comprising:

a host device to provide a known waveform;

a signal transmitter to obtain the known waveform from the host device via a channel and to emit a signal corresponding to the known waveform; and a signal receiver to convert the signal to a received waveform and emit the received waveform to the host device;

wherein the host device comprises a processor being configured to:

transform the known waveform to a reference spectral descriptor matrix and a reference magnitude representation matrix;

transform the received waveform via the signal receiver to a received spectral descriptor matrix;

obtain a similarity measure between the reference spectral descriptor matrix and the received spectral descriptor matrix;

accumulate the similarity measure based on at least one statistic of the reference magnitude representation matrix to obtain a cumulative similarity measure;

determine a delay based on the cumulated similarity measure; and output information characterizing the delay.

2. The system of claim 1, wherein the known waveform is an audio content, the signal transmitter is a loudspeaker, the signal is an acoustic signal, and the signal receiver is a microphone.

3. The system of claim 1, wherein the channel is a wired channel including one of High-Definition Multimedia Interface (HDMI) and Universal Serial Bus (USB).

4. The system of claim 1, wherein the channel is a wireless channel including one of Bluetooth and WiFi.

5. The system of claim 1, wherein the processor is configured to convert the known waveform to a first spectrum, add a floor to the first spectrum, convert the floor-added first spectrum to a first logarithmic spectrum, convert the first logarithmic spectrum to a first series of coefficients via a transformation method, wherein less than 30% of the first series of coefficients are used as reference spectral descriptors to represent the known waveform; and wherein the processor is configured to convert the received waveform to a second spectrum, add the floor to the second spectrum, convert the floor-added second spectrum to a second logarithmic spectrum, convert the second logarithmic spectrum to a second series of coefficients via the transformation method, wherein less than 30% of the second series of coefficients are used as received spectral descriptors to represent the received waveform.

6. The system of claim 5, wherein the transformation method is discrete cosine transform (DCT).

7. The system of claim 5, wherein the transformation method is one of discrete sine transform (DST), cepstrum, principal component analysis (PCA), and wavelet transform (WT).

8. The system of claim 1, wherein the reference magnitude representation matrix is a root-mean-square (RMS) of the known waveform.

9. The system of claim 1, wherein the reference magnitude representation matrix is a maximum magnitude, an average magnitude, a power, or a sound pressure level (SPL) of the known waveform.

10. The system of claim 1, wherein the similarity measure is cross-correlation.

11. The system of claim 1, wherein the similarity measure is distance.

12. The system of claim 1, wherein the at least one statistic is minimum, average, or sum.

13. The system of claim 10, wherein a candidate delay with maximum cumulated cross-correlation is determined as the delay.

14. The system of claim 11, wherein a candidate delay with minimum cumulated distance is determined as the delay.

15. A computer-implemented method comprising:

transforming a known waveform to a reference spectral descriptor matrix and storing the reference spectral descriptor matrix in a first buffer;

transforming a received waveform to a received spectral descriptor matrix and storing the received spectral descriptor matrix in a second buffer;

transforming the known waveform to a reference magnitude representation matrix and storing the reference magnitude representation matrix in a third buffer;

obtaining a similarity measure between the reference spectral descriptor matrix and the received spectral descriptor matrix;

accumulating the similarity measure based on at least one statistic of the reference magnitude representation matrix to obtain a cumulative similarity measure;

determining a delay based on the cumulated similarity measure; and outputting information characterizing the delay.

16. The method of claim 15, wherein the method is configured to convert the known waveform to a first spectrum, add a floor to the first spectrum, convert the floor-added first spectrum to a first logarithmic spectrum, convert the first logarithmic spectrum to a first series of coefficients via a transformation method, wherein less than 30% of the first series of coefficients are used as reference spectral descriptors to represent the known waveform; and wherein the method is configured to convert the received waveform to a second spectrum, add the floor to the second spectrum, convert the floor-added second spectrum to a second logarithmic spectrum, convert the second logarithmic spectrum to a second series of coefficients via the transformation method, wherein less than 30% of the second series of coefficients are used as received spectral descriptors to represent the received waveform.

17. The method of claim 16, wherein the transformation method is discrete cosine transform (DCT).

18. The method of claim 15, wherein the reference magnitude representation matrix is a root-mean-square (RMS) of the known waveform.

19. The method of claim 15, wherein the similarity measure is cross-correlation, and a candidate delay with maximum cumulated cross-correlation is determined as the delay.

20. The method of claim 15, wherein the similarity measure is distance, and a candidate delay with minimum distance is determined as the delay.

* * * * *